United States Patent [19]

Lindberg

[11] Patent Number: 5,370,885
[45] Date of Patent: Dec. 6, 1994

[54] PROCESS FOR OPTIMIZING AND BALANCING THE COMPOSITION OF FEED GIVEN TO A RUMINANT

[75] Inventor: Jan E. Lindberg, Örsundsbro, Sweden

[73] Assignee: Svenska Lantmannens Riksforbund, Stockholm, Sweden

[21] Appl. No.: 781,259

[22] PCT Filed: Jun. 27, 1990

[86] PCT No.: PCT/SE90/00459

§ 371 Date: Dec. 17, 1991

§ 102(e) Date: Dec. 17, 1991

[87] PCT Pub. No.: WO91/00021

PCT Pub. Date: Jan. 10, 1991

[30] Foreign Application Priority Data

Jun. 28, 1989 [SE] Sweden .................. 8902341-0

[51] Int. Cl.$^5$ ............................. A01K 67/00
[52] U.S. Cl. ........................ 426/231; 426/2; 426/635; 426/807
[58] Field of Search ........... 426/231, 2, 656, 635, 426/807

[56] References Cited

U.S. PATENT DOCUMENTS 4,118,513 10/1978 Braund et al. ................. 426/2
4,615,891 10/1986 Nocek et al. ................ 426/231

OTHER PUBLICATIONS

Ulbrich et al. "Influence of Energy Concentration & Source on the Utilization of Feed Protein & NPN in lambs 3. Allantain excretion & microbial protein synthesis" Dialog Data Base Biosis Number 88103815 (1989).
Tierphysiol., Tierernährg, u. Futtermittelkde., vol. 38, 1977 (Hamburg und Berlin) E. Teller et al: "Unter-su chen über den N-Stoffwechsel bei Kühen mit niedrigem N-Bedarf".
Tierphysiol., Tierernährg, u. Futtermittelkde., vol. 54, 1985 (Hamburg und Berlin) M. Kirchgessner et al: "Harnstoff und Allantoin in der Milch von Kühen während und nach Verfütterung zu hoher und zu niedriger Proteinmengen".
J. Anim. Physiol. a. Anim. Nutr., vol. 55 1986 (Hamburg und Berlin) M. Kreuzer et al: "Nährstoffverdaulichkeit, N-Stoffwechsel und Allantoinausscheidung von Hammeln bei Variation der Protein-und Energiekonzentration".
Canandian Journal Animal Science (Suppl.), vol. 64, 1984 (Ottawa, Ont.) J. Brun-Bellut et al: "Tauz d'uree du lait, allantoine urinaire, temoins de la nutrition azotee chez la chevre en lactation".
Chemical Abstracts, vol. 109, No. 11, 12 Sep. 1988, (Columbus, Ohio, US), Matsuoka, S. et al: "Effects of the level of the protein and energy intake and dietary nitrogen source on the distribution . . . in the urine of sheep".
Chemical Abstracts, vol. 110, No. 25, 19 Jun. 1989, (Columbus, Ohio, US) Matsuoka, S. et al: "Effects of protein intake on the distribution of nitrogenous compounds in the urine of sheep".

*Primary Examiner*—George Yeung
*Attorney, Agent, or Firm*—White & Case

[57] ABSTRACT

The invention relates to a process for optimizing and balancing the composition of the ration feed given to a ruminant by taking a single sample or urine or milk from the ruminant and evaluating the nutrient status of the fore-stomachs with reference to energy and protein. The process comprises: measuring the excretion of urea in the sample; measuring the excretion allantoin in the sample in relation to the excretion of creatinine to calculate an allantoin:creatinine ratio; evaluating the nutrient status of the fore-stomachs as to protein and energy; and adjusting the protein and/or energy content of the ration feed to an optimum level. The calculation of the allantoin:creatinine ratio allows for a single sample of urine or milk to be used in the evaluation of the nutrient status of the ruminant's fore-stomachs.

6 Claims, 2 Drawing Sheets

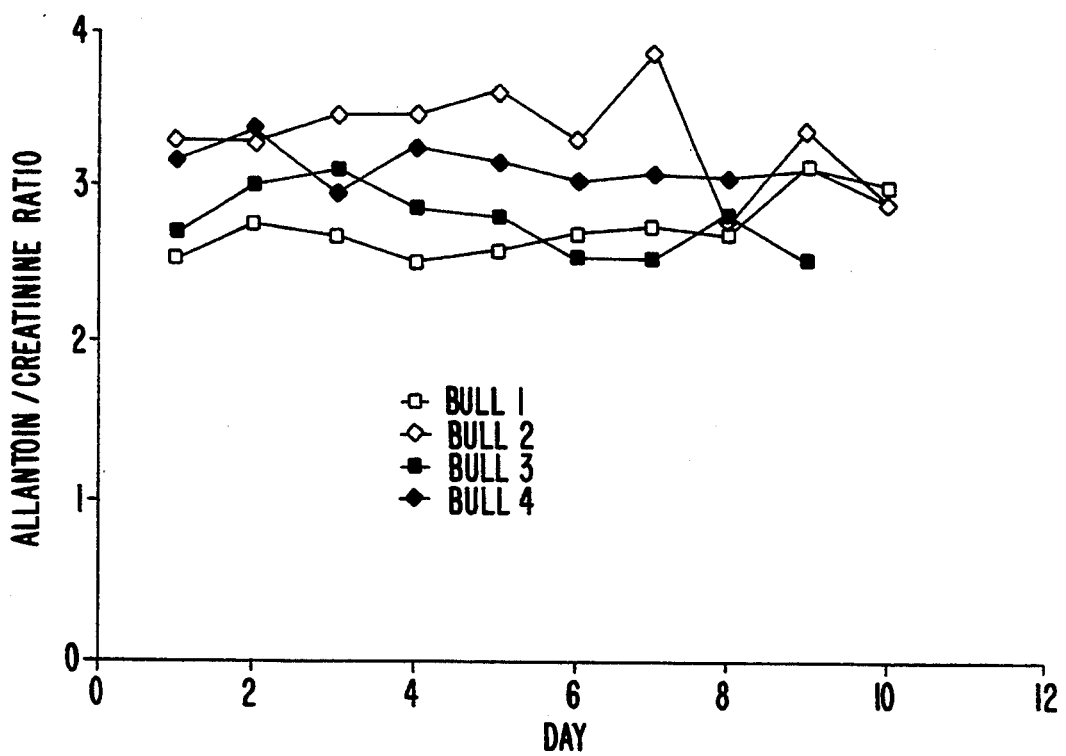
F I G. 1
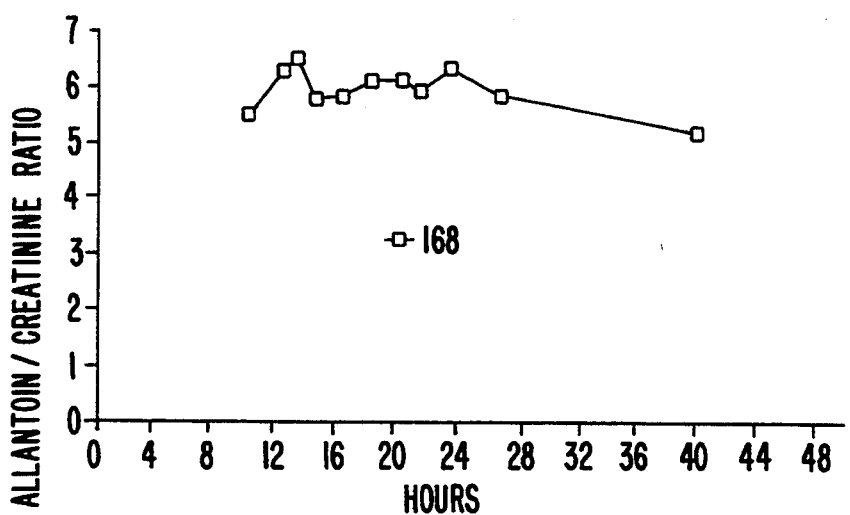
F I G. 2

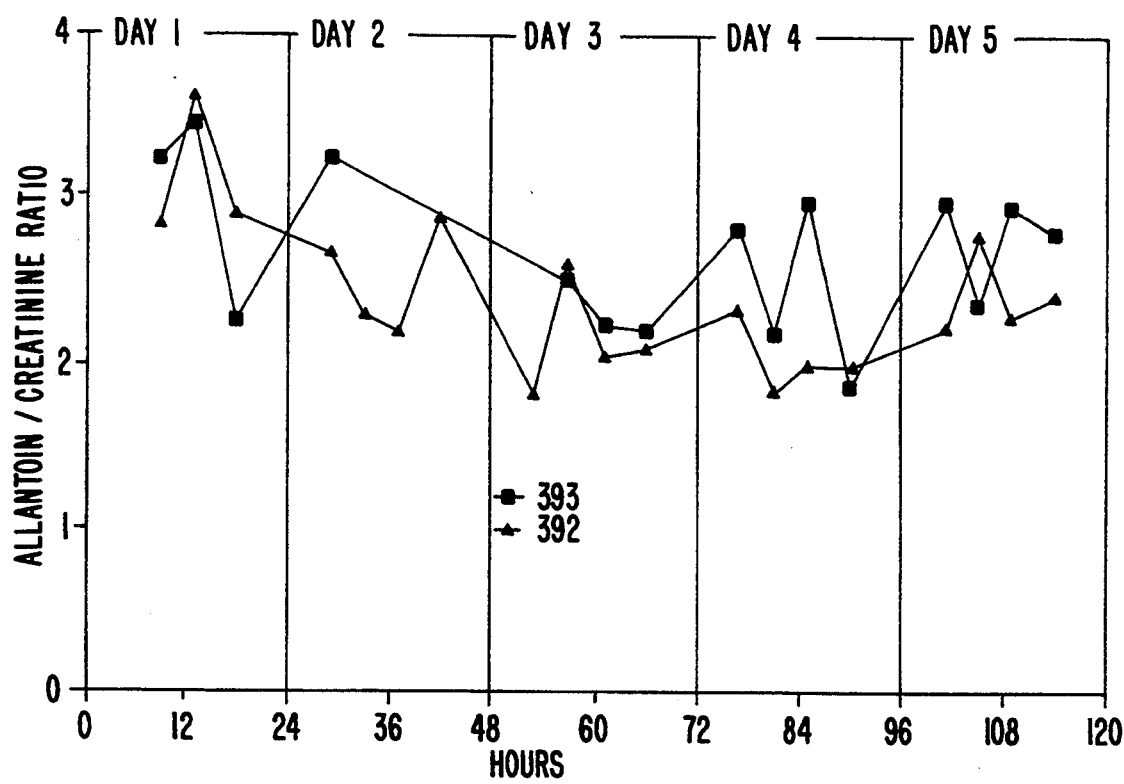
F I G. 3
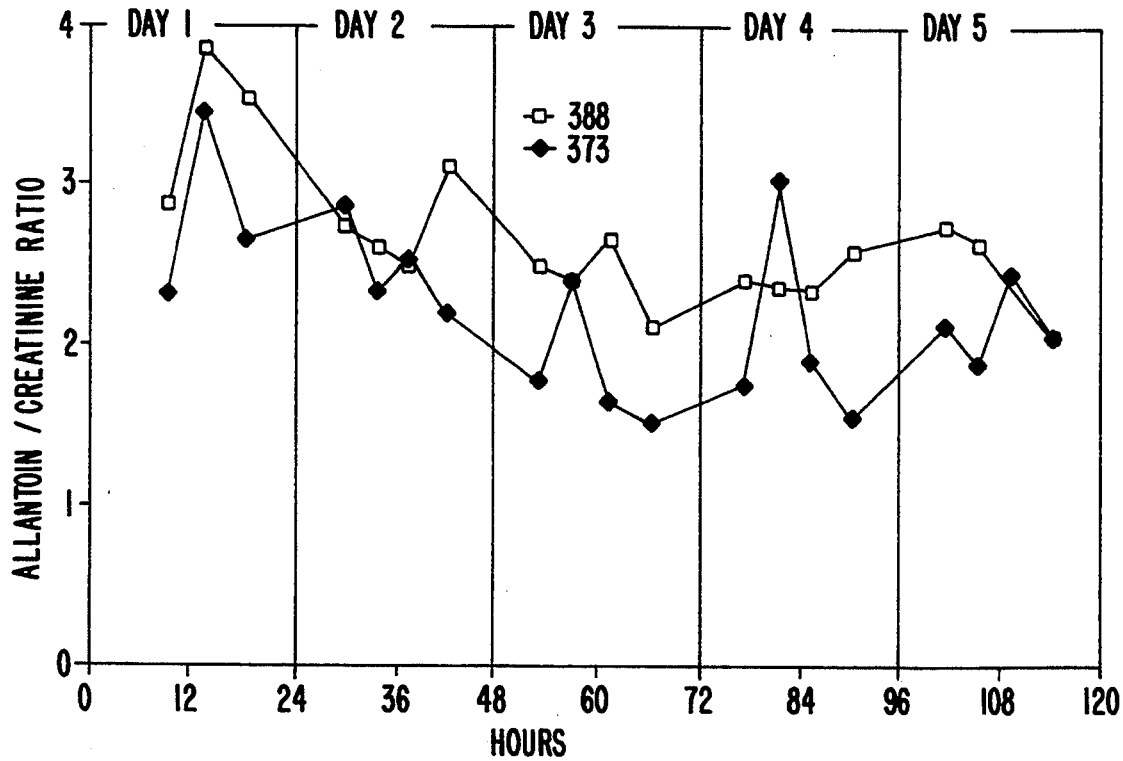
F I G. 4

PROCESS FOR OPTIMIZING AND BALANCING THE COMPOSITION OF FEED GIVEN TO A RUMINANT

BACKGROUND OF THE INVENTION

The present invention relates to a process for optimizing and balancing the composition of a ration feed given to a ruminant by evaluating the nutrient status of the fore-stomachs with reference to energy and protein. The invention also relates to a process to qualitatively determine the health status of a ruminant through assessment of the fore-stomach function.

The nutrient supply to a ruminant is largely dependent on the processes taking place in the rumen and reticulum. Also several diseases (for example lack of apetite, ketosis, acetonemia). mainly affecting high producing dairy cows, can be derived from a disturbed reticulo-rumen function.

Despite this we still lack simple methods which in a field situation can be of use in judging the ruminant fore-stomach (rumen-reticulum) function both in terms of nutrient supply and animal health.

The ruminant fore-stomachs contain approximately 10 milliards of bacteria and 0.1-1.0 millions of protozoa per ml rumen fluid. The fluid volume in a normal dairy cow can be 75 to 100 liters. Consequently the cow has a very numerous microbial population in the fore-stomachs which will affect the metabolism of the ration feed and also the nutrient absorbed by the animal. Roughly, the fiber degrading bacteria make up 20% of the total bacterial population while the non-fiber degrading bacteria make up 80%. Thus, there is a continuous competition for the most easily available carbohydrates in a ration feed and between these two kinds of rumen microorganisms. This will influence, among other things, the extent of fiber degradation and the production of volatile fatty acids and microbial protein.

For optimum fermentation the rumen bacteria require a suitable source of nitrogen. The fiber degrading bacteria require, among other things, ammonia for normal functions. A mixed microbial population probably also requires a certain proportion of amino acids and small peptides.

A high intake of free long-chain fatty acids has a depressing effect on rumen fiber degradation. This effect can probably be explained by a negative influence both on rumen bacteria and protozoa. Another factor of importance for the competition between different kind of bacteria and the nutrients available is the population of protozoa. The latter can fluctuate greatly, both in numbers and in composition, depending on, among other things, pH and osmolarity. In addition to a direct competition from the rumen protozoa for easily available soluble sugars they also compete indirectly by eating bacteria (predation) to a large extent.

These roughly outlined interactions between the nutrient content of the feed and the microbial population in the fore-stomachs will determine the nutrient supply to the host animal (the ruminant) and the efficiency in utilizing a given combination of feeds.

There is a strong relationship between ammonia produced in the rumen, as a result of microbial degradation of feed proteins, and the concentration of urea in plasma. Urea, a small and water soluble molecule, diffuses from the blood into i.a. the milk. The concentration in the milk fairly well reflects the concentration in the plasma. Several studies have shown that the ratio between crude protein and metabolizable energy in the ration feed is strongly related to the milk urea content. A difficulty in judging the nutrient balance in a ration feed from the milk urea content solely is that the plasma urea content, with which the milk urea content is related, arises from ammonia produced in the fore-stomachs, the caecum-colon as well as in various organs in the body. It is consequently not possible to determine from the urea content only, in milk for example, the nutrient balance in the fore-stomachs of an animal.

Milk is produced continuously by the mammary tissue and shows a day-to-day variation in urea content closely related to the urea content in plasma. A similar picture is true also for the urine. In a pooled milk sample, containing both morning and evening milk, possible diurnal variations have been even out, which can be of interest to reflect the rumen metabolism of crude protein in the feed. A single sample of milk or urine, adjusted in time to the rumen metabolism of the feed, could give a more clear picture of the activities in the fore-stomachs.

The rumen microbial mass contains a high proportion of nucleic acids. Approximately 15% of the total nitrogen content in bacteria are made up of nucleic acid nitrogen. The nucleic acids contains phosphate, sugar (ribose or deoxyribose), pyrimidines and purines. The purines are metabolised to allantoin, uric acid, hypoxanthine and xanthine in ruminants. These catabolites are excreted in the urine, in quantity in the above given order.

My research within this area has, among other things, shown the following. The excretion of allantoin in the urine of ruminants is linearly related to the flow of microbial protein to the small intestine. The endogenons (from the body) excretion of allantoin and other purine derivatives is fairly low and appears to be affected to a small extent by the animals intake of energy and protein. Previous studies have shown that nucleic acids in the feed is metabolized to a large extent in the rumen and probably leaves only a small contribution to the total flow of purine derivatives to the ruminant small intestine.

The urinary excretion of allantoin in ruminants appears to be the indicator for microbial activity in the fore-stomachs that we lack today.

A SUMMARY OF THE INVENTION

The present invention is based on the discovery that by combining the information of the ruminant excretion of allantoin and urea the nutrient status in the fore-stomachs, with reference to energy and protein, can be described in a simple way.

The invention therefore relates to a process for optimizing and balancing the composition of the ration feed given to a ruminant by judging the nutrient status of the fore-stomachs with reference to energy and protein; the process being characterized by determining of the ruminant excretion of urea and allantoin and emanating from the obtained combined information of the urea and allantoin content adjusting the protein and/or energy content of the ration feed to an optimum level.

A system for use in practice, which describes the ruminant metabolism from indicators excreted with the urine, presupposes either that the excretion is fairly even throughout the day or that the excretion follows a distinct pattern making single urine samples sufficient for the evaluation.

The concentration of a metabolite in the urine can vary substantially during the day, despite a constant excretion from the kidney, due to variations in the fluid metabolism. To avoid this the excretion of the metabolite of interest can be related to a marker with a constant excretion during the day and that in addition is affected only marginally by moderate variations in nutrient status. A number of studies, several from 1980 and later, suggest that creatinine meets these demands.

BRIEF DESCRIPTION OF THE DRAWINGS

FIG. 1 is a graph of the allantoin:creatinine ratio over a period of days for the four bulls discussed in Example 1.

FIG. 2 is a graph of the diurnal variation of the allantoin:creatinine ratio for the cow discussed in Example 2.

FIG. 3 is a graph of the allantoin:creatinine ratio over a period of five days for the two cows (numbered 393 and 393) discussed in Example 3.

FIG. 4 is a graph of the allantoin:creatinine ratio over a period of five days for the two cows (numbered 388 and 373) discussed in Example 3.

DETAILED DESCRIPTION OF THE INVENTION

According to a preferred embodiment of the invention the excretion of allantoin is therefore determined by relating the content of this indicator to the creatinine content, that is to say as an allantoin/creatinine (A/C) ratio.

It is also preferred to determine urea and allantoin/creatinine from single sample of urine or by combinations of single urine and milk samples.

The urea content is determined, for example, colorimetrically with diazethylmonoxine according to Technicon Instruments, 1972, Technicon Clinical Method No. 01.

The allantoin content is determined, for example, colorimetrically with the Rimini-Schryver reaction (Young & Conway, 1942) according to Lindberg, J. E. & Jansson, C. 1989: A Rapid Automated Analysis of Allantoin in Ruminant Urine. Swedish Journal of Agricultural Research (in the process of printing).

The creatinine content is determined, for example, colorimetrically with picric acid according to Technicon Instruments, 1977. Techicon Industrial Method No. SF4-011FC7.

The Rimini-Schryver reaction used in the determination of allantoin is described by Young, E. G. & Conway, C. F., 1942. On the estimation of allantoin by the Rimini-Schryver reaction. Journal of Biological Chemistry 142, 839–852.

The ruminant is preferably a dairy cow, especially a high producing dairy cow.

From the results obtained on the urea and allantoin excretion the nutrient status in the fore-stomachs is evaluated according to the following model:

| ALLANTOIN/CREATININE RATIO | | | |
|---|---|---|---|
| | L | M | H |
| UREA | | | |
| L | 1 | 4 | 7 |
| M | 3 | 6 | 9 |
| H | 2 | 5 | 8 | where
L = low excretion
M = medium excretion
H = high excretion
given that

A. at a low excretion of allantoin, that is to say, a low microbial synthesis in the fore-stomachs:
 1. low urea content indicates a lack of nitrogen in the rumen,
 2. high urea content indicates a lack of energy in the rumen,
 3. medium urea content indicates room for both more energy and nitrogen in the rumen;

B. at a medium excretion of allantoin, that is to say, a good microbial synthesis in the fore-stomachs:
 4. low urea content indicates a risk for nitrogen lack in the rumen,
 5. high urea content indicates lack of energy in the rumen,
 6. medium urea content indicates room for both more energy and nitrogen in the rumen;

C. at a high excretion of allantoin, that is to say, optimum microbial synthesis in the fore-stomachs:
 7. low urea content indicates a risk for lack of nitrogen in the rumen,
 8. high urea content indicates an excess of nitrogen in the rumen,
 9. medium urea content indicates a high utilization of the nitrogen of the ration feed.

As regards the content of milk urea in the above given model the following is valid in general:

| Low urea content | <3.0 mmol/l |
|---|---|
| Medium urea content | 3.1–5.9 mmol/l |
| High urea content | >6.0 mmol/l |

As regards the allantoin/creatinine ratio a considerable reduction of this ratio indicates a disturbed fore-stomach function. However, a general value for the A/C ratio can not be given, as this will vary with the level of production, the live weight, feed intake and feed composition. At an identical level of production and live weight a difference in the A/C ratio indicates an incorrect feed composition or a disturbed fore-stomach function.

Success in milk production is dependent on a large number of factors. Primarily an optimum ruminant function should be aimed at. To achive this a well composed and balanced ration feed in relation to the age, live weight and use is called for. The feeding of dairy cows is based on roughage, mainly as hay and silage. For cows in production even the best quality roughage has to be supplemented with concentrate to cover the cows requirements for energy and various nutrients. The cows requirements for energy and various nutrients should be met at each level of production. For cows with a high yield-potential in particular this calls for a careful choice of feedstuffs with suitable properties. In general the best production results are obtained when a great number of feedstuffs can be utilized in the ration feed, for example, via a well composed concentrate.

The concentrate supplements the roughage with energy, protein, carbohydrates, fat, minerals and vitamines. Different commercial concentrates are available which together with the roughage gives an optimum feeding.

Concentrates for dairy cows are adjusted to different roughage qualities. Both energy and protein content is considered as well as fat and mineral content. This holds also for the quality of fat, protein and carbohydrates.

Some examples of feedstuffs that can be used to adjust the protein and/or energy content of the ration feed is given below.

| Protein-rich commercial feedstuffs | | |
|---|---|---|
| | g/kg dry matter | |
| | Crude Protein | Digestible Carbohydrates |
| Cottonseed meal | 490 | 250 |
| Destillers, cereals | 300 | 347 |
| Destillers, potatoe | 260 | 428 |
| Brewers grain | 280 | 373 |
| Fish meal | 750 | 0 |
| Coconut cake | 223 | 493 |
| Meat meal | 592 | 0 |
| Maizegluten meal | 712 | 188 |
| Rapeseeds | 210 | 180 |
| Rapeseed cake | 315 | 297 |
| Rapeseed meal | 404 | 336 |
| Soya bean meal | 510 | 364 |

| Carbohydrate-rich commercial feedstuffs (Energy at rumen level) | | |
|---|---|---|
| | g/kg dry matter | |
| | Crude Protein | Digestible Carbohydrates |
| Barley | 123 | 716 |
| Oats | 125 | 563 |
| Wheat | 130 | 744 |
| Rye | 100 | 776 |
| Maize | 100 | 761 |
| Dried molassed beet pulp | 100 | 745 |
| Beet pulp | 107 | 663 |
| Beet molasses | 131 | 745 |
| Cane molasses | 25 | 862 |
| Wood molasses | 10 | 798 |

The invention also relates to a process to qualitatively determine the health status of a ruminant by judging the function of the fore-stomachs, the process being characterized by determining the excretion of allantoin and creatinine from the ruminant, a strong reduction in the allantoin/creatinine ratio in relation to normal values indicating a disturbed fore-stomach function.

Normal values for the allantoin/creatinine ratio are thus determined in a population and based on this certain qualitative assessments of the fore-stomach function can be made. As already mentioned above, however, the A/C ratio can not be used as a generalized value as this can vary with live weight and feed intake.

The invention is illustrated in more detail by the following examples.

EXAMPLE 1

Between day variation in the allantoin/creatinine ratio in bulls

Four bulls of the Swedish Red and White breed with live weights of 200–230 kg were fed with 2.0 kg hay and 2.5 kg concentrate per day. The feed was given twice daily, with half the daily allowance at each feeding. The bulls were placed in metabolism cages and urine was collected quantitatively each day for ten days.

The allantoin/creatinine ratio was on average (standard deviation within parenthesis) 2.73 (0.19), 3.33 (0.32), 2.77 (0.21) and 3.11 (0.14) for the four bulls. As shown in FIG. 1 in the enclosed drawing the variation in allantion/creatinine ratio (A/C ratio) was fairly small between days.

Example 2

Within day variation in A/C ratio in dairy cows

Urine was collected by hand during 24 hours from a total of ten dairy cows of the Swedish Red and White breed at the experimental station in Skara. The animals were producing between 17 and 37 kg of milk at the time of sampling and were all fed according to requirements.

The A/C ratio was on average between 3.91 and 6.02. The variation within day was moderate with a tendency towards lower values during the night and early morning. One Example on the diurnal variation in one cow is shown in FIG. 2 in the enclosed drawings.

The average A/C ratio in all cows with variation is given in the table below.

| Cow No. | Milk Yield, kg | A/C ratio | | |
|---|---|---|---|---|
| | | Mean | SD | CV. % |
| 168 | 37 | 6.02 | 0.38 | 6.3 |
| 255 | 32 | 6.01 | 0.64 | 10.7 |
| 260 | 17 | 3.99 | 0.50 | 12.6 |
| 299 | 29 | 4.18 | 0.45 | 10.9 |
| 322 | 24 | 3.91 | 0.29 | 7.3 |
| 326 | 37 | 5.37 | 0.55 | 10.3 |
| 348 | 31 | 4.40 | 0.54 | 12.2 |
| 360 | 21 | 3.98 | 0.49 | 12.4 |
| 362 | 27 | 4.79 | 0.37 | 7.7 |
| 373 | 20 | 3.97 | 0.36 | 9.0 |

Example 3

Effect of reduced feed intake on the A/C ratio

A total of four dairy cows were used for the experiment. The milk yield was between 20 and 23 kg milk per day. The cows were fed with 2 kg hay, 7–8 kg dry matter silage and concentrate according to production. Urine samples were collected four times per day (05.00, 09.00, 13.00, 18.00) for a total of five days. From 05.00 day 2 the feed allowance was reduced by half for two cows (393, 392) and all the concentrate was taken away from the other two cows (388, 373). From 05.00 on day 4 all cows were again given their full rations.

It can afterwards be established that the periods before and after the reduction of the feed allowance should have been made longer in order to get a more clear picture of the effects on the A/C ratio. As shown in FIG. 3 in the enclosed drawings there was a clear tendency to a decline in the A/C ratio when the feed allowance was reduced. It also appears as if the return, for each animal, to a "normal" level, that is to say comparable with the level before the change in feed intake, is markedly slower than when the feed was withdrawn.

Example 4

Dairy cow 550 kg live weight, yield potential approx. 30 kg fat-corrected (4%) milk.

| | Present feeding | | | | |
|---|---|---|---|---|---|
| | Dry matter, kg | Metabolizable energy, MJ | Digestible crude protein, g | AAT, g | PBV, g |
| Hay | 7.0 | 63.0 | 371 | 406 | −91 |
| Oats | 9.0 | 110.7 | 900 | 612 | 117 |

-continued

Present feeding

|  | Dry matter, kg | Metabolizable energy, MJ | Digestible crude protein, g | AAT, g | PBV, g |
|---|---|---|---|---|---|
| Molassed-beet pulp | 1.0 | 12.4 | 70 | 95 | −56 |
| Peas | 1.4 | 19.0 | 307 | 137 | 129 |
| Total | 18.4 | 205.1 | 1648 | 1250 | 99 |

Indications: Low yield with a milk urea concentration below 3.0 mmol/l and a low A/C ratio in the urine. Square 1 in the model.

New feeding

|  | Dry matter, kg | Metabolizable energy, MJ | Digestible crude protein, g | AAT, g | PBV, g |
|---|---|---|---|---|---|
| Hay | 7.0 | 63.0 | 371 | 406 | −91 |
| Concentrate | 11.0 | 1142.0 | 1789 | 1164 | 159 |
| Total | 18.0 | 205.0 | 2160 | 1570 | 250 |

Result: Increased yield, a normal milk urea concentration (approx. 5 mmol/l) and a higher A/C ratio in the urine. Square 6 in the model.

Example 5

Dairy cow 550 kg live weight, yield potential approx. 30 kg fat-corrected (4%) milk.

Present feeding

|  | Dry matter, kg | Metabolizable energy, MJ | Digestible crude protein, g | AAT, g | PBV, g |
|---|---|---|---|---|---|
| Silage | 10.0 | 100.0 | 1200 | 620 | 550 |
| Oats | 3.0 | 36.9 | 300 | 204 | 39 |
| Barley | 3.0 | 39.9 | 276 | 273 | −78 |
| Peas | 2.1 | 28.6 | 460 | 206 | 193 |
| Total | 18.1 | 205.4 | 2236 | 1303 | 704 |

Indications: Low yield with a milk urea concentration above 6.0 mmol/1 and: a low A/C ratio in the urine. Square 2 in the model.

New feeding

|  | Dry matter, kg | Metabolizable energy, MJ | Digestible crude protein, g | AAT, g | PBV, g |
|---|---|---|---|---|---|
| Silage | 9.0 | 90.0 | 1080 | 558 | 495 |
| Concentrate | 9.0 | 115.0 | 1080 | 1012 | 100 |
| Total | 18.0 | 205.0 | 2160 | 1570 | 595 |

Result: Increased yield, a normal milk urea concentration (approx 5 mmol/l) and a higher A/C ratio in the urine. Square 6 in the model.

EXAMPLE 6

Samples from sick cows

A small number of urine samples from sick cows have been collected with the assistance of veterinarians at the clinic at the Swedish University of Agricultural Sciences. The A/C ratio of these cows was determined and the following result was obtained.

| Cow identity | Diagnosis | A/C ratio |
|---|---|---|
| Enlund No 208 | Off-feed | 1.10 |
| No identity | Off-feed | 0.76 |
| Cow No 384, 23/9, vet. I. Holm | Not known | 1.13 |
| Wahlberg No 167 | Acetonemia | 2.61 |

The values presented above are clearly lower, particularly for the cows given the diagnosis off-feed, than what could be expected for normally fed cows (see Example 2 above). The level for the cow with acetonemia is at a level comparable with the cows receiving a reduced feed allowance (see Example 3 above).

I claim:

1. A process for qualitatively determining the health status of a ruminant by judging the function of the rumeno-reticular fore-stomachs comprising:
   a) measuring the excretion of allantoin and creatinine in a single sample of urine or milk taken from the ruminant to calculate an allantoin:creatinine ratio;
   b) comparing the allantoin:creatinine ratio to a normal value of the allantoin:creatinine ratio, wherein the normal value is known for the ruminant being evaluated and wherein a reduction of the allantoin:creatinine ratio from the normal value indicates a disturbance in the function of the rumeno-reticular fore-stomachs.

2. The process according to claim 1, wherein the excretion of allantoin and creatinine is measured in the urine.

3. A process for optimizing and balancing the content of protein and energy in a feed ration fed to a ruminant which comprises taking a single sample of urine or milk from the ruminant and evaluating, from the sample, the nutrient status of the rumeno-reticular fore-stomachs of the ruminant as to energy and protein according to the following steps:
   a) measuring the excretion of urea in the sample taken from the ruminant;
   b) measuring the excretion of allantoin in the sample taken from the ruminant in relation to the excretion in the sample of a marker comprising creatinine to calculate an allantoin:creatinine ratio;
   c) determining whether the excretion of urea and the allantoin:creatinine ratio are low, medium or high in relation to normal values, wherein the normal values are known for the ruminant being evaluated;
   d) evaluating the nutrient status of the rumeno-reticular fore-stomachs as to protein and energy in terms of urea and allantoin:creatinine excretion which gives rise to one of situations 1–9 set forth in the following table:

|  | ALLANTOIN/CREATININE RATIO | | |
|---|---|---|---|
|  | L | M | H |
| UREA | | | |
| L | 1 | 4 | 7 |
| M | 3 | 6 | 9 |
| H | 2 | 5 | 8 | where
L=low
M=medium
H=high
and where:

A low allantoin:creatinine ratio combined with:
- a low urea content indicates a lack of nitrogen in the rumen (situation 1),
- a high urea content indicates a lack of energy in the rumen (situation 2),
- a medium urea content indicates room for both more energy and nitrogen in the rumen (situation 3);

A medium allantoin:creatinine ratio combined with:
- a low urea content indicates a risk of lack of nitrogen in the rumen (situation 4),
- a high urea content indicates lack of energy in the rumen (situation 5),
- a medium urea content indicates room for both more energy and nitrogen in the rumen (situation 6);

A high allantoin:creatinine combined with:
- a low urea content indicates a risk of lack of nitrogen in the rumen (situation 7),
- A high urea content indicates an excess of nitrogen in the rumen (situation 8)
- a medium urea content indicates a high utilization of the nitrogen in the feed ration (situation 9).

e) adjusting the protein and/or energy content of the ration feed to an optimum level according to the situation determined for the ruminant being evaluated.

4. The process according to claim 3, wherein the ruminant is a dairy cow.

5. The process according to claims 3 or 4 wherein the excretion of urea, allantoin and creatinine are measured in the urine.

6. The process according to claims 3 or 4 wherein the excretion of urea is measured in the milk and the excretion of allantoin is measured in the urine.

* * * * *